US012804312B2

(12) United States Patent
Zhang et al.

(10) Patent No.: US 12,804,312 B2
(45) Date of Patent: Nov. 17, 2026

(54) MOLECULAR SIEVE MATERIAL FOR SOUND ABSORPTION AND METHOD FOR PREPARING THE SAME

(71) Applicant: AAC Technologies (Nanjing) Co., Ltd., Nanjing (CN)

(72) Inventors: Jie Zhang, Nanjing (CN); Hezhi Wang, Nanjing (CN); Zhongyang Wang, Nanjing (CN)

(73) Assignee: AAC Technologies (Nanjing) Co., Ltd., Nanjing (CN)

( * ) Notice: Subject to any disclaimer, the term of this patent is extended or adjusted under 35 U.S.C. 154(b) by 637 days.

(21) Appl. No.: 18/324,110

(22) Filed: May 25, 2023

(65) Prior Publication Data

US 2024/0214721 A1 Jun. 27, 2024

Related U.S. Application Data

(63) Continuation of application No. PCT/CN2023/082177, filed on Mar. 17, 2023.

(30) Foreign Application Priority Data

Dec. 27, 2022 (CN) ......................... 202211680532.5

(51) Int. Cl.

*H04R 1/28* (2006.01)
*C01B 39/02* (2006.01)
*H04R 1/02* (2006.01)

(52) U.S. Cl.

CPC ........... *H04R 1/288* (2013.01); *C01B 39/026* (2013.01); *H04R 1/02* (2013.01); *C01P 2004/03* (2013.01); *C01P 2006/12* (2013.01); *C01P 2006/14* (2013.01); *C01P 2006/16* (2013.01)

(58) Field of Classification Search

CPC .......... H04R 1/288; H04R 1/02; C01B 39/026
See application file for complete search history.

(56) References Cited

U.S. PATENT DOCUMENTS 5,759,950 A * 6/1998 Gui ....................... C07C 5/2754 502/355
2003/0115859 A1* 6/2003 Deeba .................. F01N 3/0231 60/297

FOREIGN PATENT DOCUMENTS

CN 110510633 A * 11/2019 ............. C01B 39/40

* cited by examiner

*Primary Examiner* — James A Fiorito
(74) *Attorney, Agent, or Firm* — Wiersch Law Group

(57) ABSTRACT

A molecular sieve material for sound absorption and a method for preparing the same are disclosed. There is a pore structure formed by mesopores with a pore size between 10 and 50 nm on a surface of the molecular sieve material, and the mesopores have a pore volume above 0.25 $cm^3/g$. The molecular sieve material is obtained by etching and modifying a molecular sieve raw powder with an aqueous solution of an inorganic alkali. Since an alkali solution can selectively remove part of silicon elements in a skeleton structure of molecular sieve, more and more pore structures are generated in molecular sieve particles, which can increase the specific surface area and thus enhance the adsorption capacity of the molecular sieve for gases. The frequency reduction performance of the speaker can be significantly improved after the rear cavity of the speaker is filled with the molecular sieve material.

7 Claims, 3 Drawing Sheets

MOLECULAR SIEVE MATERIAL FOR SOUND ABSORPTION AND METHOD FOR PREPARING THE SAME

TECHNICAL FIELD

The present disclosure belongs to the field of acoustic materials, specifically to a molecular sieve material for sound absorption and a method for preparing the same.

BACKGROUND

When a speaker is working, inside a cavity of the speaker, diaphragms move back and forth will make an air pressure inside the cavity change, and a changed air pressure in turn will impede movements of the diaphragms, thus distorting sound waves it emits.

After the speaker is encapsulated, an impact of a cavity volume size on an overall resonance frequency is expressed as the smaller the cavity (the greater the rigidity, which can be interpreted as the greater the obstruction to free movements of the diaphragms back and forth), the higher the resonance frequency.

A molecular sieve, as a porous structure material, can continuously adsorb and desorb the air in the cavity when the cavity is vibrating, thus indirectly increasing the volume of the cavity.

Limited by an overall size of portable devices such as phones, in order to obtain better speaker low frequency effect, on the one hand, the resonance frequency of a product is required to be as low as possible; on the other hand, the speaker cavity is expected to be as small as possible to save space, which requires the development of cavity filling materials with higher frequency reduction performance.

The molecular sieve is a commonly used cavity filling material, and the amount of gas it adsorbs is the key to determine the frequency reduction effect. In general, the more pore structures of molecular sieve particles, the more air will be adsorbed and the better frequency reduction effect will be achieved.

Therefore, there is urgent need to develop molecular sieve materials with more pore structures.

SUMMARY

An objective of the present disclosure is to provide a molecular sieve material for sound absorption with a larger specific surface area and better gas adsorption performance by modifying a molecular sieve raw powder, which can further enhance a low frequency performance of the speaker.

Specifically, in one aspect, the present disclosure provides a molecular sieve material for sound absorption, there is a pore structure formed by mesopores with a pore size between 10 and 50 nm on a surface of the molecular sieve material, and the mesopores have a pore volume above 0.25 $cm^3/g$, preferably 0.25~0.60 $cm^3/g$.

The molecular sieve material of the present disclosure has a specific surface area generally with 360~800 $m^2/g$, preferably 450~600 $m^2/g$.

Preferably, the molecular sieve material for sound absorption of the present disclosure is formed from a molecular sieve raw powder having a Si—Al molar ratio between 15 and 200, and such molecular sieve raw powder has one or more structures of MFI, FER and MEL.

In one embodiment, the molecular sieve material for sound absorption of the present disclosure is loaded on a porous loading medium, and the porous loading medium may be selected from one or more of a polymer foam, a carbon fiber foam, a graphite material and a metal skeleton material.

Accordingly, the present disclosure also provides a method for preparing the molecular sieve material for sound absorption, the method includes following steps.

Step 1) modifying etching a molecular sieve raw powder with an aqueous solution of an inorganic alkali to produce a pore structure formed by mesopores with a pore size between 10 and 50 nm on a surface of the molecular sieve raw powder to obtain a modified molecular sieve material, the molecular sieve raw powder having a molar ratio of Si—Al between 15 and 200.

Step 2) rinsing rinsing the modified molecular sieve material obtained in step 1) with water until its pH is neutral.

As used in herein, the inorganic alkali is selected from one or more of sodium hydroxide, potassium hydroxide, sodium carbonate, potassium carbonate, sodium bicarbonate, potassium bicarbonate, ammonia. The aqueous solution of the inorganic alkali generally has a concentration of 0.05~0.5 mol/L, preferably 0.05~0.2 mol/L. Preferably, a solvent "water" of the aqueous solution of the inorganic alkali is deionized water.

In the step 1) modifying of the present disclosure, there is no special restriction on the ratio of the molecular sieve raw powder to the aqueous solution of the inorganic alkali, as long as the aqueous solution of the inorganic alkali can etch, so that the surface of the molecular sieve raw powder can produce a pore structure formed by mesopores with a pore size between 10 and 50 nm. Usually, 1 to 100 g, such as 5 to 50 g, of the molecular sieve raw powder may be added to 1 L of the aqueous solution of the inorganic alkali.

In the step 1) modifying of the present disclosure, etching is generally performed at 50~80° C., preferably in a water bath under stirring conditions, and there is no special limitation on an etching time, generally 4~8 h is sufficient.

In one embodiment, the method further includes a forming step 3.1), and the forming step 3.1) is carried out by following steps.

Step 3.1.1) after drying the modified molecular sieve obtained in step 2), a dried modified molecular sieve is mixed with water and adhesive to obtain a suspension.

Step 3.1.2) processing the suspension by using a forming technique to obtain a molecular sieve material having a desired shape.

As used in herein, the forming technique includes, but not limited to, one or more of granulation, extrusion, spray drying, freeze drying, and spraying. Preferably, the forming technique is granulation and/or freeze drying.

In another embodiment, the method further includes a loading step 3.2), the loading step is carried out by following steps.

Step 3.2.1) after drying the modified molecular sieve obtained in step 2), a dried modified molecular sieve is mixed with water and adhesive to obtain a suspension.

Step 3.2.2) immersing a porous loading media in the suspension so as to load the modified molecular sieve onto the porous loading media.

As used in herein, the porous loading medium is selected from one or more of polymer foam, carbon fiber foam, graphite material and metal skeleton material.

In the method according to the present disclosure, preferably in the step 3.1.1) and 3.2.1), the dried modified molecular sieve is mixed with water and adhesive in a mass ratio of 1:(0.6~1.5):(0.02~0.10). As used in herein, the adhesive includes, but not limited to, one or more of acrylic adhesives, acrylate adhesives, butylbenzene adhesives, polyurethane adhesives, epoxy adhesives, and silicone adhesives, preferably acrylic adhesives.

In another aspect, the present disclosure further provides a speaker, as shown in FIG. 3, the speaker includes a housing having a receiving space, an acoustic monomer placed in the housing, and a rear chamber enclosed by the acoustic monomer and the housing. The rear chamber is filled with the molecular sieve material of the present disclosure. The molecular sieve can increase a sound compliance of airs in the rear chamber, and thus improving the low frequency performance of the speaker.

Compared with existing technologies, the present disclosure has at least following advantages.

Firstly, the molecular sieve material of the present disclosure is obtained by etching the molecular sieve raw powder with the aqueous solution of the inorganic alkali. Since the alkali solution can selectively remove part of silicon elements in a skeleton structure of molecular sieve, more and more irregular pore structures are generated in molecular sieve particles, which can increase the specific surface and thus enhance the adsorption capacity of the molecular sieve for gases.

Secondly, after filing into the rear chamber of the speaker, the molecular sieve material of the present disclosure can adsorb and desorb more air molecules under the action of acoustic pressure, which can make the low frequency performance of the speaker significantly improved.

These and other objectives, aspects, and advantages of the present disclosure will be apparent in light of the following description of the present disclosure and in conjunction with the accompanying drawings.

Figure 1:
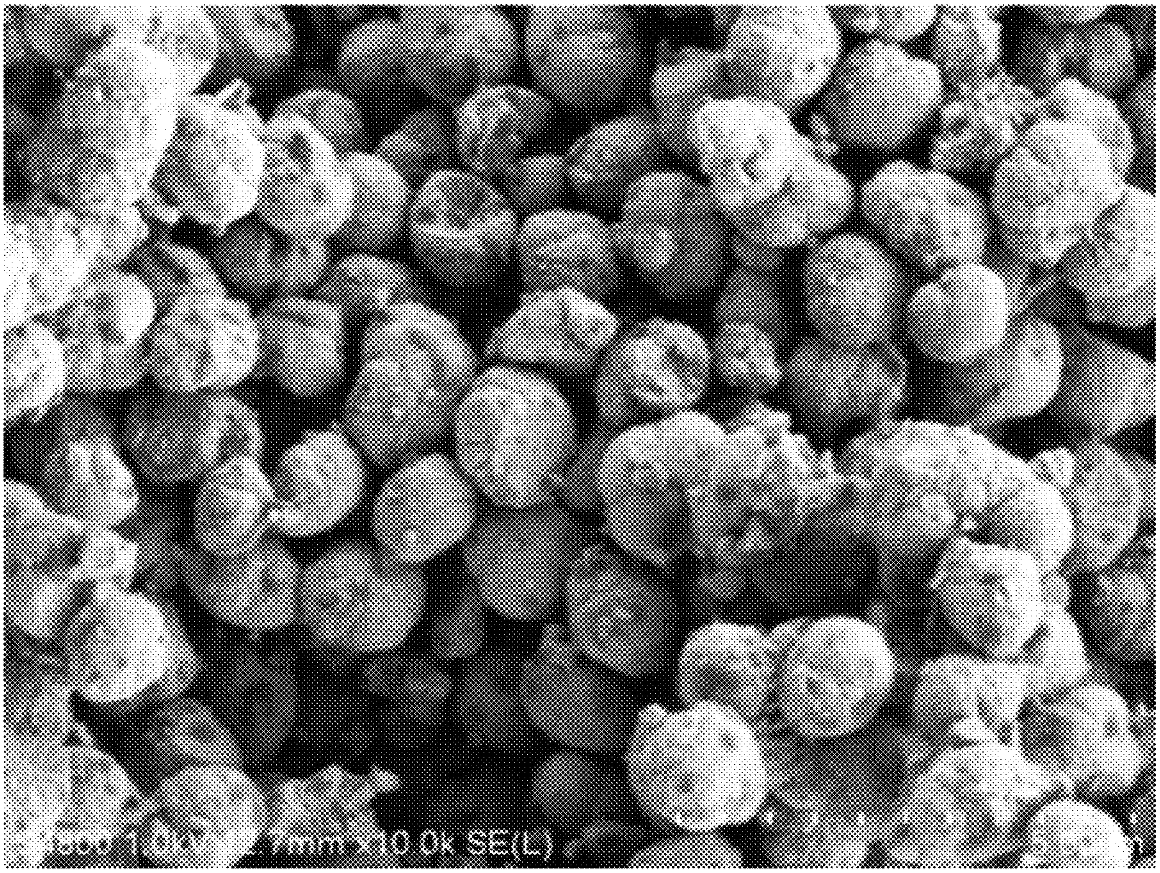
FIG. 1 shows a SEM photograph of molecular sieve particles before alkali etching in accordance with some embodiments of the present disclosure.

Reference signs of the present disclosure are as follows. 1. housing, 2. acoustic monomer, 3. rear chamber.

DETAILED DESCRIPTION OF THE EMBODIMENTS

Desilication modification, as a modification method that destroys a small amount of acidic sites, not only does not damage to the activity of the molecular sieve, but also generates a certain amount of multistage pore structure. Therefore, the adsorption capacity of the molecular sieve can be effectively improved by desilication of the molecular sieve to produce multistage pores.

However, a Si—Al ratio of the molecular sieve has a very strong influence on the desilication effect of inorganic alkali. When the Si—Al ratio of a treated molecular sieve, such as ZSM-5 molecular sieve, is lower than 15, even if the temperature, concentration of the alkali solution and treatment time are increased, a treated molecular sieve cannot achieve better desilication effect and the pore structure produced is very limited. When the Si—Al ratio of the treated molecular sieve, such as ZSM-5 molecular sieve, is higher than 200, it is very easy to produce large pores larger than 50 nm, which makes the molecular sieve skeleton collapses.

In order to avoid the problems of poor desilication or collapse of the structure caused by excessive desilication during etching, the present disclosure uses a molecular sieve raw powder with a molar ratio of Si—Al ranging from 15 to 200 as a starting material and modifies the molecular sieve by alkali etching. The alkali etching can etch a large number of pore structures on the surface of the molecular sieve raw powder and thus increase the specific surface area of the molecular sieve, and most of these pore structures are mesopores with a pore size between 10 and 50 nm.

Depending on specific filling requirements, the molecular sieve material modified by alkali etching may be mixed with adhesive and water, and a resulted mixture may be processed by a corresponding forming technique to obtain a the molecular sieve acoustic material with a desired shape. For example, the resulted mixture may be spray dried to obtain granular, e.g., microspherical acoustic materials; and the viscosity of the resulted mixture may be increased and extruded to obtain acoustic blocks.

When the molecular sieve acoustic material of the present disclosure has a shape of granular such as microspheres, its particle size is generally 10~1000 μm, preferably 100~500 μm.

A microspherical molecular sieve acoustic material may be prepared as following steps.

(1) A required amount of inorganic alkali and deionized water are weighed, and mixed well under stirring to make an aqueous solution of inorganic alkali with a concentration of 0.05~0.2 mol/L.

(2) An appropriate amount of molecular sieve (Si—Al molar ratio between 15~200) is weighed, added it slowly to the above aqueous solution of inorganic alkali, stirred and then a resulted mixture is placed in a water bath at 50~80 °C, and reacted for 4~8 h with uniform stirring to obtain a molecular sieve modified by alkali etching.

(3) A modified molecular sieve obtained above is filtered through filter paper and rinsed with deionized water until a filtrate has a neutral pH, and then the modified molecular sieve obtained above is placed in an oven to dry. Herein rinsing with deionized water to neutral can avoid effects of alkaline ions on an activity of the molecular sieve itself, and also wash away silicon-containing substances produced during etching.

(4) Above dried modified molecular sieve, deionized water and adhesive are weighed in a mass ratio of 1:(0.6~1.5):(0.02~0.10).

(5) Above starting materials are stirred for 2 h to mix homogeneous to obtain a suspension B. If necessary, the suspension B may also be filtered through a strainer to remove large undispersed particles to obtain a suspension C.

(6) Through a granulation device, the suspension C is dispersed into small droplets of uniform size and dropped into a cooling tower and then frozen into solid particles a.

(7) Resulted solid particles a are put into a freeze-drying oven drying 12 h, then all the water in the particles is sublimated to obtain solid particles b.

(8) The solid particles b are put into an oven at 100~150° C. and dried for 2 h to obtain the microspherical molecular sieve acoustic material.

If a block-shaped molecular sieve acoustic material is desired, the suspension C (or suspension B) may be put into a molding mold, and then dried after freeze drying.

The molecular sieve material prepared by the present disclosure can also be loaded onto a porous loading media.

For example, the molecular sieve material may be loaded on sponge foam or carbon fiber to obtain an elastic filling material. In the preparation, the porous loading medium, such as organic foam, carbon fiber foam, etc., is soaked in the suspension C (or suspension B), and then dried after freeze drying to obtain such elastic filling material.

In the present disclosure, the expression "molecular sieve material for sound absorption" is sometimes referred to as "molecular sieve acoustic material".

In the present disclosure, the term "room temperature" refers to an ambient temperature in the range of 18~25° C.

The following is further illustrated by means of embodiments, and it should be understood that the specific embodiments described herein are intended to explain the present disclosure only and are not intended to limit the present disclosure.

PREPARATION EXAMPLES

Example 1: a molecular sieve for sound absorption is prepared according to following steps.

I) weigh 4 g of sodium hydroxide, dissolve in IL of deionized water and mix with stirring to obtain an aqueous solution of sodium hydroxide with a concentration of 0.1 mol/L.

II) Weigh 10 g of ZSM-5 molecular sieve raw powder with molar ratio of Si—Al between 15~200, add it slowly to the above aqueous solution of sodium hydroxide, mix with stirring, then put a resulted mixture in a water bath at 60° C. and react with constant stirring for 6 h to obtain a modified ZSM-5 molecular sieve.

III) Filter the modified ZSM-5 molecular sieve obtained in step II) through filter paper and rinse it repeatedly with deionized water until a filtrate has a neutral pH, and then dry the modified ZSM-5 molecular sieve obtained in an oven at 120° C.

IV) Weigh 10 g of the modified ZSM-5 molecular sieve after drying, 10 g of deionized water, and 1 g of acrylic adhesive, and mix them well, stir for 2 h at room temperature to obtain a suspension.

V) Disperse the suspension obtained in step IV) into small droplets of uniform size through a granulation device, drop the small droplets into a cooling tower and then freeze into solid particles.

VI) Put the solid particles into a vacuum drying oven at −40° C. for 12 h, and then put dried particles into the oven at 110° C. for 2 h to obtain a microspherial molecular sieve acoustic material.

Before experiment, the molecular sieve raw powder is scanned with a scanning electron microscope at 10,000 times, its SEM photograph is shown in FIG. 1, from which it can be seen that the particles have a granular shape and surface integrity with almost no pore structure present.

Figure 2:
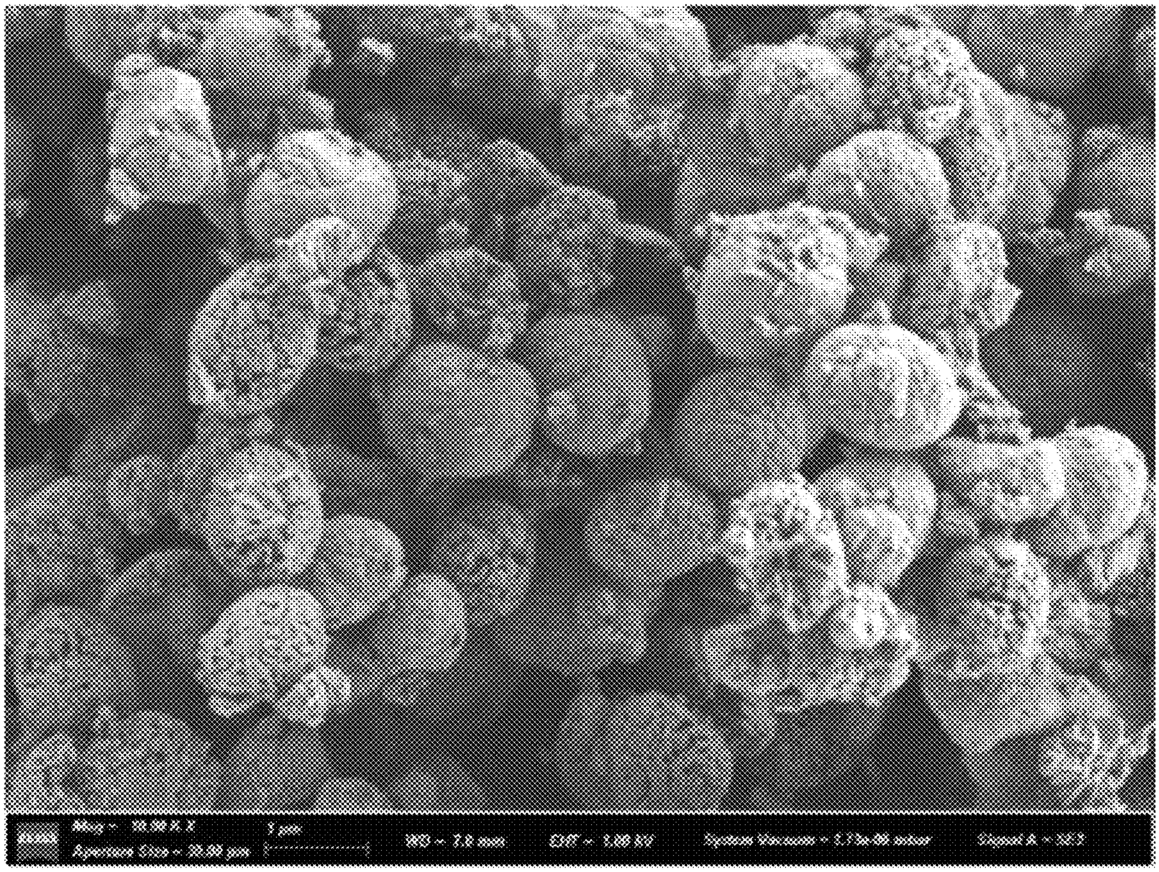
FIG. 2 shows a SEM photograph of the molecular sieve particles after inorganic alkali etching in accordance with some embodiments of the present disclosure.

After the experiment is finished, an obtained microspherical molecular sieve acoustic material is also scanned with the scanning electron microscope at 10,000 times, its SEM photograph is shown in FIG. 2, from which it can be seen that after inorganic alkali etching, a larger number of pore structures appear on the surface of the molecular sieve, and most of these structures are mesopores with a pore size between 10 and 50 nm.

COMPARATIVE EXAMPLE

The comparative example is not modified by alkali etching, but by direct microsphere formation from the molecular sieve raw powder according to steps IV) to VI) of example 1.

Specific Surface Area Measurement

The specific surface area, overall pore volume (expressed as $V_{total}$), mesopore pore volume (expressed as $V_{meso}$) of the molecular sieve materials obtained from example 1 and the comparative example are tested by using a BET test method. Test results are shown in Table 1 below.

TABLE 1

| Samples | Specific surface area ($m^2 \cdot g^{-1}$) $S_{BET}$ | pore volume ($cm^3 \cdot g^{-1}$) $V_{total}$ | $V_{meso}$ | $V_{micro}$ |
|---|---|---|---|---|
| Example 1 | 497 | 0.353 | 0.308 | 0.045 |
| Comparative example | 352 | 0.275 | 0.182 | 0.093 |

According to the results in table 1, compared with the comparative example, the molecular sieve acoustic material obtained from example 1 modified by alkali etching has a significantly higher specific surface area and also a larger overall pore volume, which is due to the fact that after etching with the aqueous solution of the inorganic alkali, some of the silicon elements in the molecular sieve are removed, leaving an irregular pore structure (see FIG. 1 and FIG. 2), which can adsorb more gases. The mesopore pore volume of the molecular sieve acoustic material obtained from example 1 modified by alkali etching increases significantly, while micropore pore volume therein decreases significantly, because the mesopore structure formed by alkali etching would swallow some of the micropores.

Acoustic Performance Test

A resonance frequency ($F_0$) of the speaker is determined by measuring a frequency dependent resistance and its phase, as well as its corresponding over-zero point.

According to particle sizes, the molecular sieve materials obtained from example 1 and the comparative example are each divided into 3 groups, with the particle size of 200~300 μm for group 1, 300~355 μm for group 2, and 355~450 μm for group 3.

Figure 3:
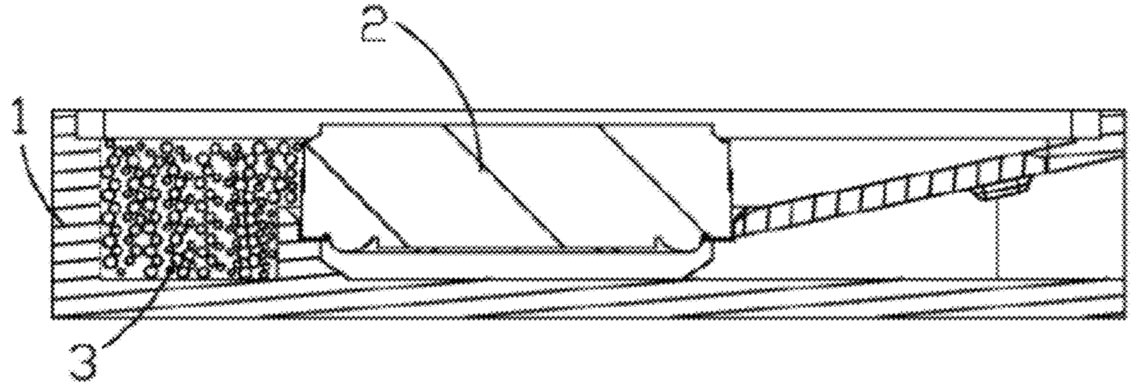
FIG. 3 illustrates a structural schematic diagram of the speaker in accordance with some embodiments of the present disclosure.

A speaker with a 0.5 $cm^3$ (cc) rear cavity and a 11 mm×15 mm×3 mm acoustic monomer is connected to a impedance analyzer, the groups of the molecular materials each is filled with the rear cavity of the speaker respectively (see FIG. 3), and the $F_0$ of the speaker is determined. Then compare with a cavity $F_0$ and calculate an offset value of $F_0$, that is, $F_0$ reduction. The results are shown in table 2 below. Herein the $F_0$ reduction indicates a degree of resonance frequency shift to low frequency, in general, the greater the $F_0$ reduction value, the better the low frequency performance of the speaker.

TABLE 2

| Samples | Particle size (μm) | Cavity $F_0$ (Hz) | $F_0$ after filled with sample (Hz) | $F_0$ reduction (Hz) |
|---|---|---|---|---|
| Example 1 | 200~300 | 980 | 741 | 239 |
| | 300~355 | 981 | 743 | 238 |
| | 355~450 | 983 | 758 | 225 |
| Comparative example | 200~300 | 983 | 768 | 215 |
| | 300~355 | 982 | 775 | 207 |
| | 355~450 | 980 | 779 | 201 |

As can be seen from the table 2, compared with the comparative example, the speaker that its rear cavity filled with the molecular sieve acoustic material modified by alkali etching of example 1 has a significantly greater $F_0$ reduction value, that is, the molecular sieve acoustic material modified by alkali etching has stronger sound absorption properties.

The above is a detailed description of the purpose, technical solutions and advantages of the present disclosure. It should be understood that the above is only embodiments and specific examples of the present disclosure, and is not intended to limit the scope of protection of the present disclosure, and any modification, equivalent replacement, improvement, etc. made within the spirit and principles of the present disclosure shall be included in the scope of the protection of the present disclosure.

What is claimed is:

1. A method for preparing a molecular sieve material for sound absorption, comprising steps of:

1) etching a molecular sieve raw powder with an aqueous solution of an inorganic alkali to produce a pore structure formed by mesopores with a pore size between 10 and 50 nm on a surface of the molecular sieve raw powder to obtain a modified molecular sieve material, the molecular sieve raw powder having a molar ratio of Si—Al between 15 and 200;

2) rinsing the modified molecular sieve material obtained in step 1) with water until its pH is neutral;

3) after drying the modified molecular sieve obtained in step 2), a dried modified molecular sieve is mixed with water and adhesive to obtain a suspension;

immersing a porous loading media in the suspension so as to load the modified molecular sieve onto the porous loading media to obtain an elastic filling material;

wherein there is a pore structure formed by mesopores with a pore size between 10 and 50 nm on a surface of the molecular sieve material, and the mesopores have a pore volume above 0.25 cm3/g;

the porous loading medium is selected from one or more of polymer foam, carbon fiber foam graphite material and metal skeleton material.

2. The method according to claim 1, wherein further comprises a forming step 3.1), the forming step 3.1) being carried out by following steps of:

3.1.1) after drying the modified molecular sieve obtained in step 2), a dried modified molecular sieve is mixed with water and adhesive to obtain a suspension;

3.1.2) processing the suspension by using a forming technique to obtain a molecular sieve material having a desired shape.

3. The method according to claim 1, wherein the aqueous solution of the inorganic alkali has a concentration of 0.05~0.2 mol/L.

4. The method according to claim 1, wherein the inorganic alkali is selected from one or more of sodium hydroxide, potassium hydroxide, sodium carbonate, potassium carbonate, sodium bicarbonate, potassium bicarbonate, ammonia.

5. The method according to claim 1, wherein the etching is performed at 50~80° C. in step 1).

6. The method according to claim 2, wherein in step 3.1.1), the dried modified molecular sieve is mixed with water and adhesive in a mass ratio of 1:(0.6~1.5):(0.02~0.10).

7. The method according to claim 2, wherein in step 3.1.2), the forming technique is selected from one or more of granulation, extrusion, spray drying, freeze drying, and spraying.

* * * * *